US012584513B2

(12) United States Patent
Guo

(10) Patent No.: US 12,584,513 B2
(45) Date of Patent: Mar. 24, 2026

(54) SUCKER STRUCTURE AND A FENCE HEREOF

(71) Applicant: Guangzhou Sair Industrial Co.,Ltd, Guangzhou (CN)

(72) Inventor: Jiye Guo, Guangzhou (CN)

(73) Assignee: Guangzhou Sair Industrial Co., Ltd, Guangzhou (CN)

( * ) Notice: Subject to any disclaimer, the term of this patent is extended or adjusted under 35 U.S.C. 154(b) by 0 days.

(21) Appl. No.: 18/806,790

(22) Filed: Aug. 16, 2024

(65) Prior Publication Data

US 2025/0243893 A1     Jul. 31, 2025

(30) Foreign Application Priority Data

Jan. 31, 2024    (CN) .......................... 202420249505.0

(51) Int. Cl.
*F16B 47/00*        (2006.01)
*E04H 17/22*        (2006.01)
*E04H 17/18*        (2006.01)

(52) U.S. Cl.
CPC ............. *F16B 47/00* (2013.01); *E04H 17/22* (2013.01); *E04H 17/18* (2013.01)

(58) Field of Classification Search
None
See application file for complete search history.

(56) References Cited

U.S. PATENT DOCUMENTS

| | | | | |
|---|---|---|---|---|
| 2,932,510 A | * | 4/1960 | Kravitz | ................... A63B 3/00 |
| | | | | 482/17 |
| 6,406,002 B1 | * | 6/2002 | Hardy, III | ............... E04H 17/18 |
| | | | | 256/64 |
| 6,666,420 B1 | * | 12/2003 | Carnevali | ............... F16B 47/00 |
| | | | | 248/205.8 |
| 7,607,622 B2 | * | 10/2009 | Carnevali | ............... F16B 47/00 |
| | | | | 248/205.8 |
| 12,146,338 B1 | * | 11/2024 | Li | ........................... E04H 17/18 |
| 2011/0095149 A1 | * | 4/2011 | Fan | ......................... F16B 47/00 |
| | | | | 248/206.2 |
| 2025/0163724 A1 | * | 5/2025 | Liang | .................... E06B 11/022 |

\* cited by examiner

*Primary Examiner* — Steven M Marsh
(74) *Attorney, Agent, or Firm* — JEEN IP LAW, LLC

(57) ABSTRACT

The present invention discloses a sucker structure and a fence hereof, and the technical solution of the present invention includes a fence formed by a plurality of connected frames and a sucker body, the positions between two adjacent frames corresponding to the bottom and top of the fence are connected by a connecting seat, a connecting portion for connection with the connecting seat is disposed at the top of the sucker body, the sucker body can increase or decrease the spacing between the sucker bodies based on the insertion depth of the connecting portion and the connecting seat and, after reaching the specified spacing, the connecting portion and the connecting seat can be locked by screws to maintain a detachable connection between the sucker body and the fence.

8 Claims, 3 Drawing Sheets

SUCKER STRUCTURE AND A FENCE HEREOF

CROSS-REFERENCE TO RELATED APPLICATIONS

This application claims priority to Chinese Patent Application No. 202420249505.0, filed on Jan. 31, 2024, which is hereby incorporated by reference in its entirety.

TECHNICAL FIELD

The present invention relates to the field of protective fences, in particular to a sucker structure and a fence hereof.

BACKGROUND

In order to adapt to various venues, prefabricated fences which have been widely applied are composed of a plurality of frames assembled by connecting pieces, and adjacent frames is fastened through connecting pieces after the angle between adjacent frames is adjusted, and the existing prefabricated fences can be used on the site after assembly. Due to their direct placement and absence of fixed structure, the fences are prone to movement during use due to external forces, such as being blown by the wind or pushed by infants, which poses safety hazards.

SUMMARY

The main purpose of the present invention is to propose a sucker structure and a fence hereof to address the problems proposed in the background art mentioned above.

To achieve the above purpose, the invention proposes a sucker structure, including a sucker body, and a connecting portion for detachable connection with the fence is provided at the top of the sucker body.

The invention proposes a fence, including a plurality of frames and a sucker structure, the sucker structure is the above-mentioned one, a plurality of frames are connected to form a long strip or frame shaped fence, and the positions between adjacent frames corresponding to the bottom and top of the fence are connected by a connecting seat, the connecting portion is connected with the connecting seat that is located at the bottom of the fence, and the spacing between the sucker body and the connecting seat can be increased or reduced by adjusting the insertion depth of the connecting portion, and screws are provided for detachable locking between the connecting portion and the connecting seat after a specified spacing is maintained between the sucker body and the connecting seat.

The technical solution of the present invention includes a fence formed by a plurality of connected frames and a sucker body, the positions between two adjacent frames corresponding to the bottom and top of the fence are connected by a connecting seat, a connecting portion for connection with the connecting seat is disposed at the top of the sucker body, the sucker body can increase or decrease the spacing between the sucker bodies based on the insertion depth of the connecting portion and the connecting seat and, after reaching the specified spacing, the connecting portion and the connecting seat can be locked by screws to maintain a detachable connection between the sucker body and the fence. Compared with traditional methods, the present invention can fix the fence in the installation position through the sucker body, avoiding the safety hazards to the infants caused by the sliding of the fences and, in addition, based on the connection depth between the connecting portion and the connecting seat, the distance between the sucker body and the fence, as well as the height of the fence can be adjusted, so that the technical solution provides a simple overall structure that is easy to operate.

DETAILED DESCRIPTION OF THE EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

The invention proposes a sucker structure.

Figure 1:
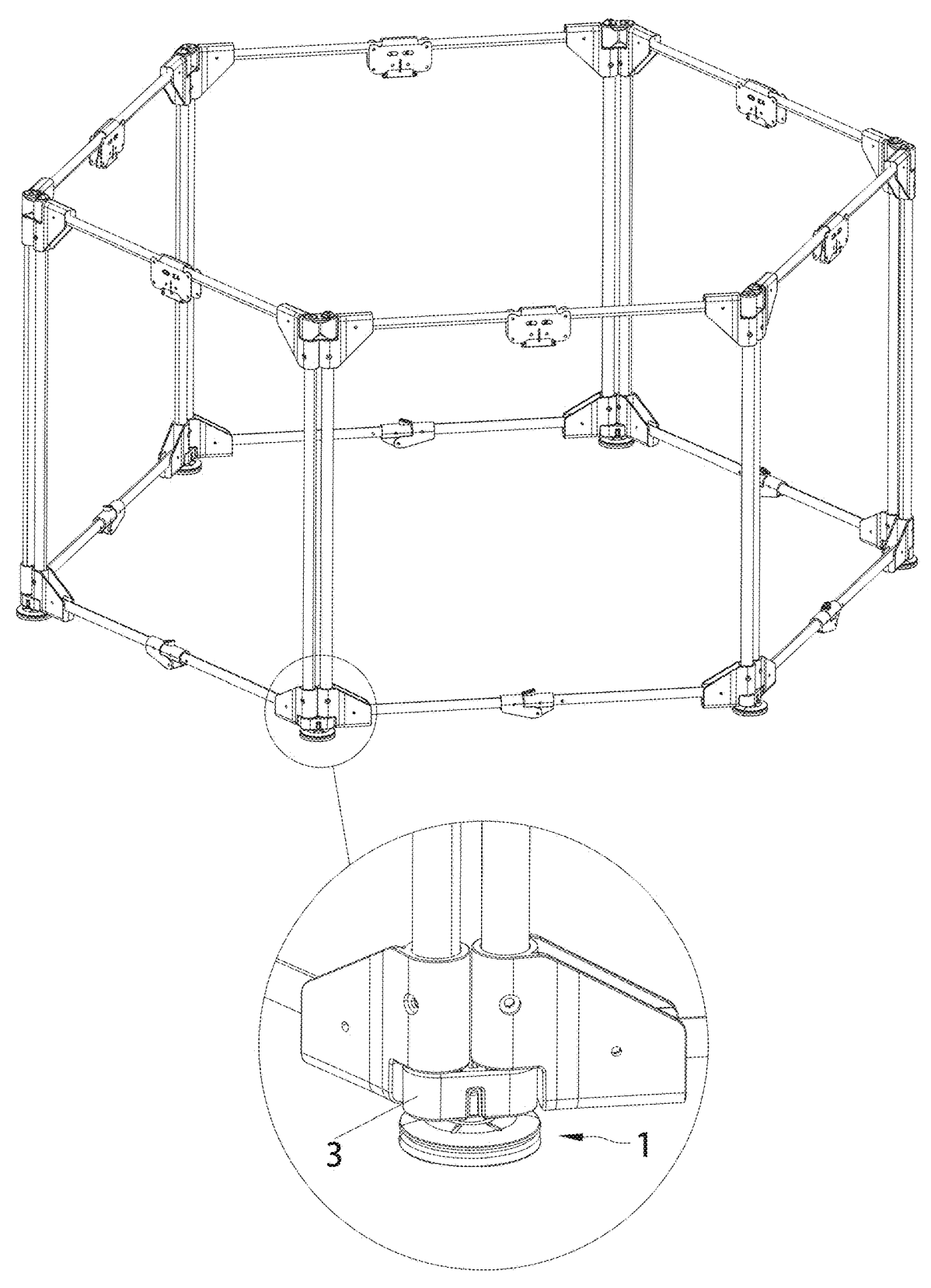
FIG. 1 is 3D view of the present invention.
Figure 2:
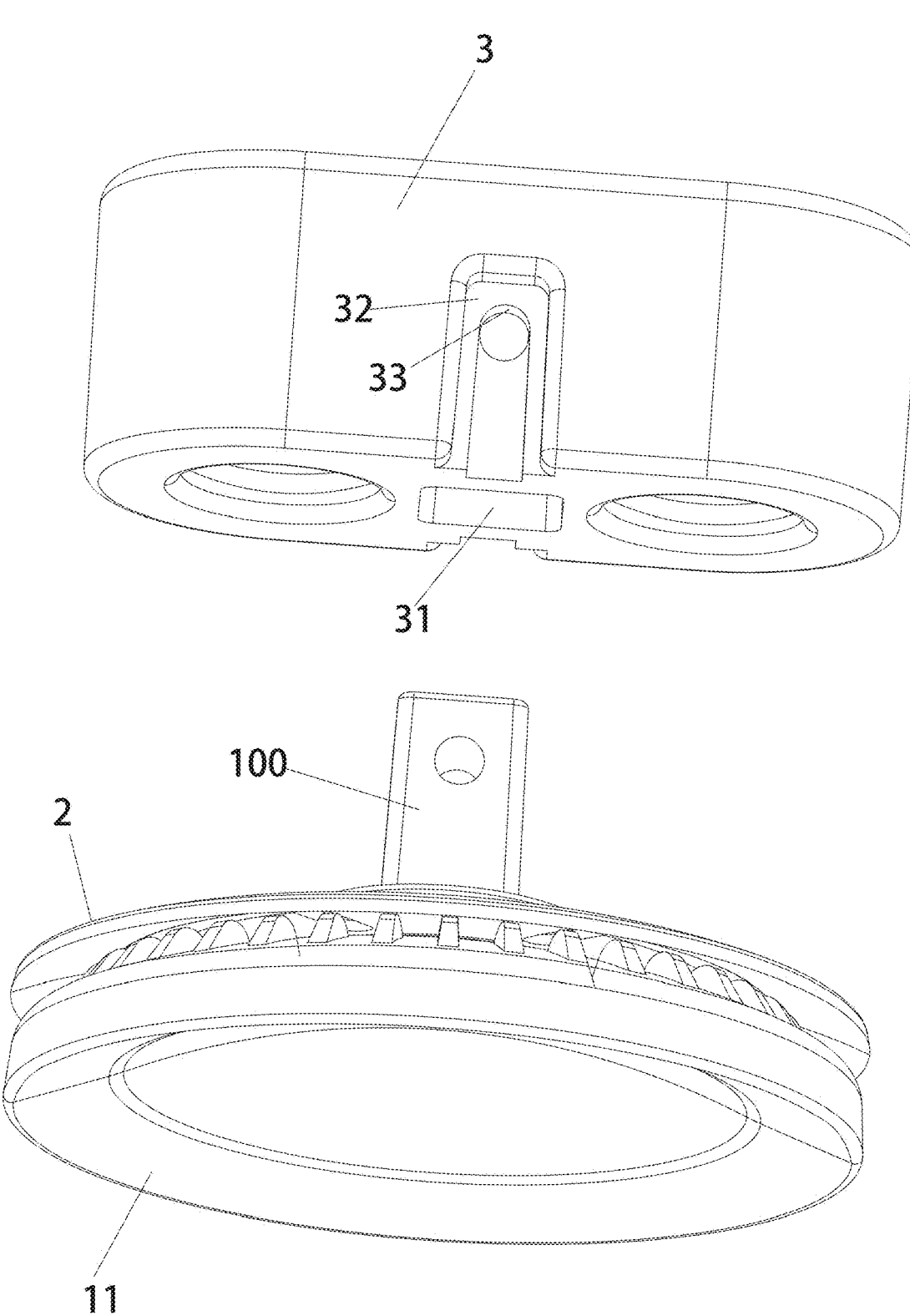
FIG. 2 is a 3D view of the sucker body.
Figure 3:
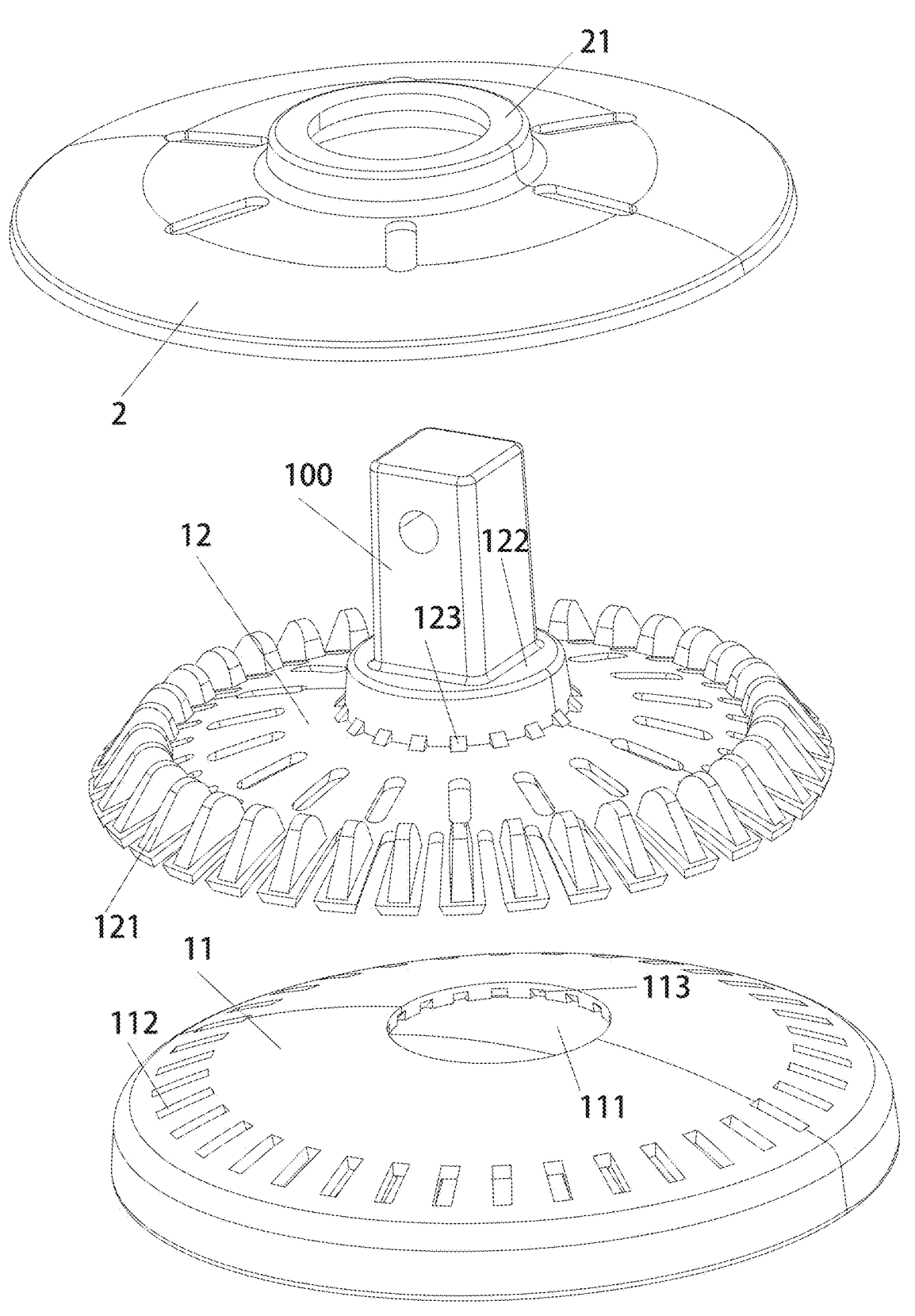
FIG. 3 is an exploded view of the sucker body and connecting seat.

In the embodiments of the present invention, as shown in FIGS. 1 to 3, the sucker structure includes a sucker body 1, and a connecting portion 100 for detachable connection with the fence is provided at the top of the sucker body 1.

The technical solution of the present invention includes a fence formed by a plurality of connected frames and a sucker body, the positions between two adjacent frames corresponding to the bottom and top of the fence are connected by a connecting seat, a connecting portion for connection with the connecting seat is disposed at the top of the sucker body, the sucker body can increase or decrease the spacing between the sucker bodies based on the insertion depth of the connecting portion and the connecting seat and, after reaching the specified spacing, the connecting portion and the connecting seat can be locked by screws to maintain a detachable connection between the sucker body and the fence. Compared with traditional methods, the present invention can fix the fence in the installation position through the sucker body, avoiding the safety hazards to the infants caused by the sliding of the fences and, in addition, based on the connection depth between the connecting portion and the connecting seat, the distance between the sucker body and the fence, as well as the height of the fence can be adjusted, so that the technical solution provides a simple overall structure that is easy to operate.

Specifically, the sucker body 1 includes a first disc body 11 and a second disc body 12, the first disc body 11 is internally provided with a cavity 111 that fits the second disc body 12, the top of the first disc body 11 is provided with an opening for the cavity 111, the second disc body 12 is installed in the cavity 111, and the top of the second disc body 12 is provided with a connecting portion 100 that can pass through the opening of the cavity 111 and be exposed outside.

Specifically, the top of the first disc body 11 is ringly spaced with a plurality of positioning holes 112 connected to the cavity 111, and the position of the second disc body 12 corresponding to the positioning hole 112 is provided with a positioning portion 121 that can pass through the positioning hole 112 and be exposed to the outside, and the first disc body 11 and the second disc body 12 can be locked by the combination of the positioning hole 112 and the positioning portion 121.

Specifically, a protective cover 2 is also provided, and the protective cover 2 is sleeved on the connecting portion 100 and part bottom wall of the protective cover (2) is pressed against the positioning portion 121.

Specifically, a boss 122 is provided at the position of the second disc body 12 corresponding to the opening of cavity 111, the boss 122 can pass through the opening of cavity 111 and be exposed externally, the connecting portion 100 is formed on the top wall of the boss 122, and the position of the protective cover 2 corresponding to the boss 122 is provided with a border 21 that can cover the boss 122.

Specifically, a plurality of fixture blocks 123 are provided at intervals along the transition position between the boss 122 and the second disc body 12, and a clamping hole 113 that fits the fixture block 123 is provided at the position on the inner wall of the cavity 111 corresponding to the fixture block 123, and after the boss 122 passes through the opening of cavity 111 and is exposed to the outside, the fixture block 123 is inserted into the clamping hole 113.

Specifically, the present invention also proposes a fence, including a plurality of frames and a sucker structure, a plurality of frames are connected to form a long strip or frame shaped fence, and the positions between adjacent frames corresponding to the bottom and top of the fence are connected by a connecting seat 3, the connecting portion 100 is connected with the connecting seat 3 that is located at the bottom of the fence, and the spacing between the sucker body 1 and the connecting seat 3 can be increased or reduced by adjusting the insertion depth of the connecting portion 100 and, screws are provided for detachable locking between the connecting portion 100 and the connecting seat 3 after a specified spacing is maintained between the sucker body 1 and the connecting seat 3, and the bottom wall of the connecting seat 3 is pressed against the partial top wall of the protective cover 2.

Reference can be made to the above embodiments for the specific structure of the sucker structure and, as this fence adopts all the technical solutions of the sucker structure mentioned above, the fence has at least all the beneficial effects brought by the technical solutions of the sucker structure mentioned above, which will not be elaborated here.

Specifically, the connecting portion 100 is columnar, the connecting seat 3 is provided with a socket 31 that fits the connecting portion 100, and the connecting portion (100) can be inserted into the socket 31 from bottom to top and, by the screws of which the rod passes through the connecting seat horizontally, can be connected with the connecting portion 100 to lock the connecting portion 100 and connecting seat 3.

Specifically, the outer wall of the connecting seat 3 is provided with a vertically extending strip hole 32, and one side of the strip hole 32 near the connecting portion 100 is partially opened to form a vertically extending moving channel 33, the moving channel 33 is in connected to the socket 31, and the rod of the screw can be connected to the connecting portion 100 after passing through the moving channel 33.

In another embodiment, strip holes 32 are provided on opposite outer walls on both sides of the connecting seat 3, wherein one strip hole is provided with a nut, and the rod part of the screw is inserted into the other strip hole and screwed to the nut after through the connecting portion, so as to lock the connecting seat 3 and the connecting portion 100.

Specifically, the cross-section of the connecting portion 100 is non circular.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. A sucker structure, including a sucker body, and a connecting portion for detachable connection with a fence is provided at a top of the sucker body;

wherein the sucker body comprises a first disc body and a second disc body, the first disc body is internally provided with a cavity that fits the second disc body, a top of the first disc body is provided with an opening for the cavity, the second disc body is installed in the cavity, and a top of the second disc body is provided with the connecting portion that can pass through the opening of the cavity and be exposed outside;

the top of the first disc body is further provided with a plurality of positioning holes connected to the cavity, and a position of the second disc body corresponding to the positioning holes is provided with a positioning portion that can pass through the positioning holes and be exposed to the outside, and the first disc body and the second disc body can be locked by a combination of the positioning holes and the positioning portion.

2. The sucker structure according to claim 1, wherein a protective cover is also provided, and the protective cover is sleeved on the connecting portion and a partial bottom wall of the protective cover is pressed against the positioning portion.

3. The sucker structure according to claim 2, wherein a boss is provided at a position of the second disc body corresponding to the opening of the cavity, the boss can pass through the opening of the cavity and be exposed externally, the connecting portion is formed on a top wall of the boss, and a position of the protective cover corresponding to the boss is provided with a border that can cover the boss.

4. The sucker structure according to claim 3, wherein a plurality of fixture blocks are provided at intervals along a transition position between the boss and the second disc body, and a clamping hole that fits the fixture blocks is provided at a position on an inner wall of the cavity corresponding to the fixture blocks, and after the boss passes through the opening of the cavity and is exposed to the outside, the fixture blocks are inserted into the clamping hole.

5. A fence, including a plurality of frames, and the sucker structure according to claim 1, wherein the plurality of frames are connected to form a long strip or frame shaped fence, and positions between adjacent frames corresponding to a bottom and a top of the fence are connected by a connecting seat, the connecting portion is connected with the connecting seat that is located at a bottom of the fence, and a spacing between the sucker body and the connecting seat can be increased or reduced by adjusting an insertion depth of the connecting portion and, screws are provided for detachable locking between the connecting portion and the connecting seat after a specified spacing is maintained between the sucker body and the connecting seat, and a bottom wall of the connecting seat is pressed against a partial top wall of the protective cover.

6. The sucker structure according to claim 5, wherein the connecting portion is columnar, the connecting seat is provided with a socket that fits the connecting portion, and the connecting portion can be inserted into the socket from bottom to top and, by the screws of which a rod passes through the connecting seat horizontally, can be connected with the connecting portion to lock the connecting portion and the connecting seat.

7. The sucker structure according to claim 6, wherein an outer wall of the connecting seat is provided with a vertically extending strip hole, and one side of the strip hole near the connecting portion is partially opened to form a vertically extending moving channel, the moving channel is connected to the socket, and the rod of the screw can be connected to the connecting portion after passing through the moving channel.

8. The sucker structure according to claim 6, wherein a cross-sectional area of the connecting portion is non circular.

* * * * *